US012056199B2

(12) United States Patent
Schneider

(10) Patent No.: US 12,056,199 B2
(45) Date of Patent: Aug. 6, 2024

(54) SYSTEM AND METHOD FOR DESIGN-BASED RELATIONSHIP MATCHMAKING

(71) Applicant: Daniel Schneider, Hollywood, CA (US)

(72) Inventor: Daniel Schneider, Hollywood, CA (US)

( * ) Notice: Subject to any disclaimer, the term of this patent is extended or adjusted under 35 U.S.C. 154(b) by 6 days.

(21) Appl. No.: 17/695,562

(22) Filed: Mar. 15, 2022

(65) Prior Publication Data

US 2023/0297634 A1     Sep. 21, 2023

(51) Int. Cl.
*G06F 16/00* (2019.01)
*G06F 16/9535* (2019.01)
*G06F 16/9536* (2019.01)
*G06F 16/9538* (2019.01)
*G06N 20/00* (2019.01)
*G06V 10/774* (2022.01)
*G06Q 50/00* (2012.01)

(52) U.S. Cl.
CPC ...... *G06F 16/9535* (2019.01); *G06F 16/9536* (2019.01); *G06F 16/9538* (2019.01); *G06N 20/00* (2019.01); *G06V 10/774* (2022.01); *G06Q 50/01* (2013.01)

(58) Field of Classification Search
CPC ............ G06F 16/9535; G06F 16/9536; G06F 16/9538; G06N 20/00; G06V 10/774; G06Q 50/01
See application file for complete search history.

(56) References Cited

U.S. PATENT DOCUMENTS

| 7,225,338 | B2 | 5/2007 | Khan |
| 7,277,891 | B2 | 10/2007 | Howard |
| 7,809,172 | B2 | 10/2010 | Lubow |
| 7,962,467 | B2 | 6/2011 | Howard |
| 9,582,723 | B2 | 2/2017 | Tiwari |
| 9,720,936 | B2 | 8/2017 | Partington |
| 2014/0117087 | A1* | 5/2014 | Aldaag ................. G06Q 30/02 235/494 |

(Continued)

OTHER PUBLICATIONS https://play.google.com/store/apps/details?id=com.mlabeca.police.tool.nl&hl=en_US&gl=US.

*Primary Examiner* — Jared M Bibbee
(74) *Attorney, Agent, or Firm* — OMNIVALUT LLC; Robert Denis

(57) ABSTRACT

A system and method for providing non-binary profile mapping of individuals according to the present invention is disclosed. The system includes a memory having instructions stored thereon and a processor configured to execute the instructions on the memory to cause the electronic apparatus to perform the method. The method receives user profile data from an external user, the user profile data comprises captured media having a user image and user characteristic information data, pre-processes a user image into training, testing, and updating learning networks, stores processed user profile data into a database, receive user synthetic profile data to create a synthetic profile representation, adjust the synthetic profile representation in response to user input, generates a first set of matching results from processing the synthetic profile representation against user profile data from the database using the learning networks, and provides the first set of matching results for selection.

20 Claims, 6 Drawing Sheets

(56) References Cited

U.S. PATENT DOCUMENTS

| | | |
|---|---|---|
| 2014/0314283 A1 | 10/2014 | Harding |
| 2018/0060360 A1 | 3/2018 | Majkowska |
| 2019/0251073 A1* | 8/2019 | Dasari ................... G06F 16/285 |
| 2020/0311090 A1* | 10/2020 | Pichaimurthy ..... G06F 16/9535 |
| 2020/0389470 A1* | 12/2020 | Kursun .................. G06N 20/00 |
| 2021/0065314 A1* | 3/2021 | Storment ................ H04L 51/52 |
| 2021/0232706 A1* | 7/2021 | Peruski .................. G06N 20/00 |
| 2021/0281916 A1* | 9/2021 | Jaiswal ................ H04N 21/454 |
| 2022/0343438 A1* | 10/2022 | Burton ................... G06Q 50/01 |
| 2023/0090269 A1* | 3/2023 | Vasudevan ............. G06V 10/40<br>382/317 |
| 2023/0274030 A1* | 8/2023 | Kalaboukis ......... G06F 21/6245<br>726/26 |

* cited by examiner

SYSTEM AND METHOD FOR DESIGN-BASED RELATIONSHIP MATCHMAKING

TECHNICAL FIELD

This application relates in general to a system and method for providing a matching mechanism, and more specifically, to a system and method for providing non-binary profile mapping of individuals.

BACKGROUND

The current dating/relationship application trend relies heavily on a binary acceptance/rejection visual component to match prospective relationships or suspends the appearance component in order to enable other features i.e. messaging (often on a match). This presents a needle-in-a-haystack scenario from two sides where not only does A have to appear before B and B has to make a binary positive choice; similarly, a binary positive is required should B appear before A respectively. The limited understanding of the application as to what is "liked" by a user is bound by the acceptance of visual criteria and rigid questioning. This binary signal is further muddied by the influence of other criteria beyond appearance such as age, location, and religion thus not presenting a clear signal for a match.

Therefore, a need exists for system and method for providing non-binary profile mapping of individuals. The present invention attempts to address the limitations and deficiencies in prior solutions according to the principles and example embodiments disclosed herein.

SUMMARY

In accordance with the present invention, the above and other problems are solved by providing a system and method for non-binary profile mapping of individuals according to the principles and example embodiments disclosed herein.

In one embodiment, the present invention is a system for providing non-binary profile mapping of individuals. The system includes a memory having instructions stored thereon and a processor configured to execute the instructions on the memory to cause the electronic apparatus to perform the method. The method receives user profile data from an external user, the user profile data comprises captured media having a user image and user characteristic information data, pre-processes a user image into training, testing, and updating learning networks, stores processed user profile data into a database, receive user synthetic profile data to create a synthetic profile representation, adjust the synthetic profile representation in response to user input, generates a first set of matching results from processing the synthetic profile representation against user profile data from the database using the learning networks, and provides the first set of matching results for selection.

In an aspect of the present invention, processor further executing instructions to rank the set of matching results utilizing the user characteristic information data, receive user input to further adjust the synthetic profile representation in response to user input, generate a second set of matching results from processing the synthetic profile representation against user profile data using the learning networks, and provide the second set of matching results for selection.

In another aspect of the present invention, the processor further executing instructions to encode, compress, and conform user profile data into a set of attributes, process the user profile data to conform to training set data, and generate a set of internal parameters and weights and biases for use by the learning network, and output encoded user profile data processed using the set of internal parameters and weights and biases for storage in the database.

In another aspect of the present invention, the processor further executing instructions to define a restricted set of user profile data using one or more of the user characteristic information data, generate a third set of matching results from processing the synthetic profile representation against the restricted set of user profile data using the learning networks, and provide the third set of matching results for selection.

In another aspect of the present invention, the user profile data further comprises video and audio data of a user, the video and audio data of a user is processed by the learning network for inclusion in the database.

In another embodiment, the present invention is a method for providing non-binary profile mapping of individuals. The method receives user profile data from an external user, the user profile data comprises captured media having a user image and user characteristic information data, pre-processes a user image into training, testing, and updating learning networks, stores processed user profile data into a database, receive user synthetic profile data to create a synthetic profile representation, adjust the synthetic profile representation in response to user input, generates a first set of matching results from processing the synthetic profile representation against user profile data from the database using the learning networks, and provides the first set of matching results for selection.

In yet another embodiment of the present invention provides a non-transitory computer-readable recording medium in an electronic apparatus for providing non-binary profile mapping of individuals, the non-transitory computer-readable recording medium storing one or more programs which when executed by a programmable processor of the electronic apparatus performs steps of the methods described above.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
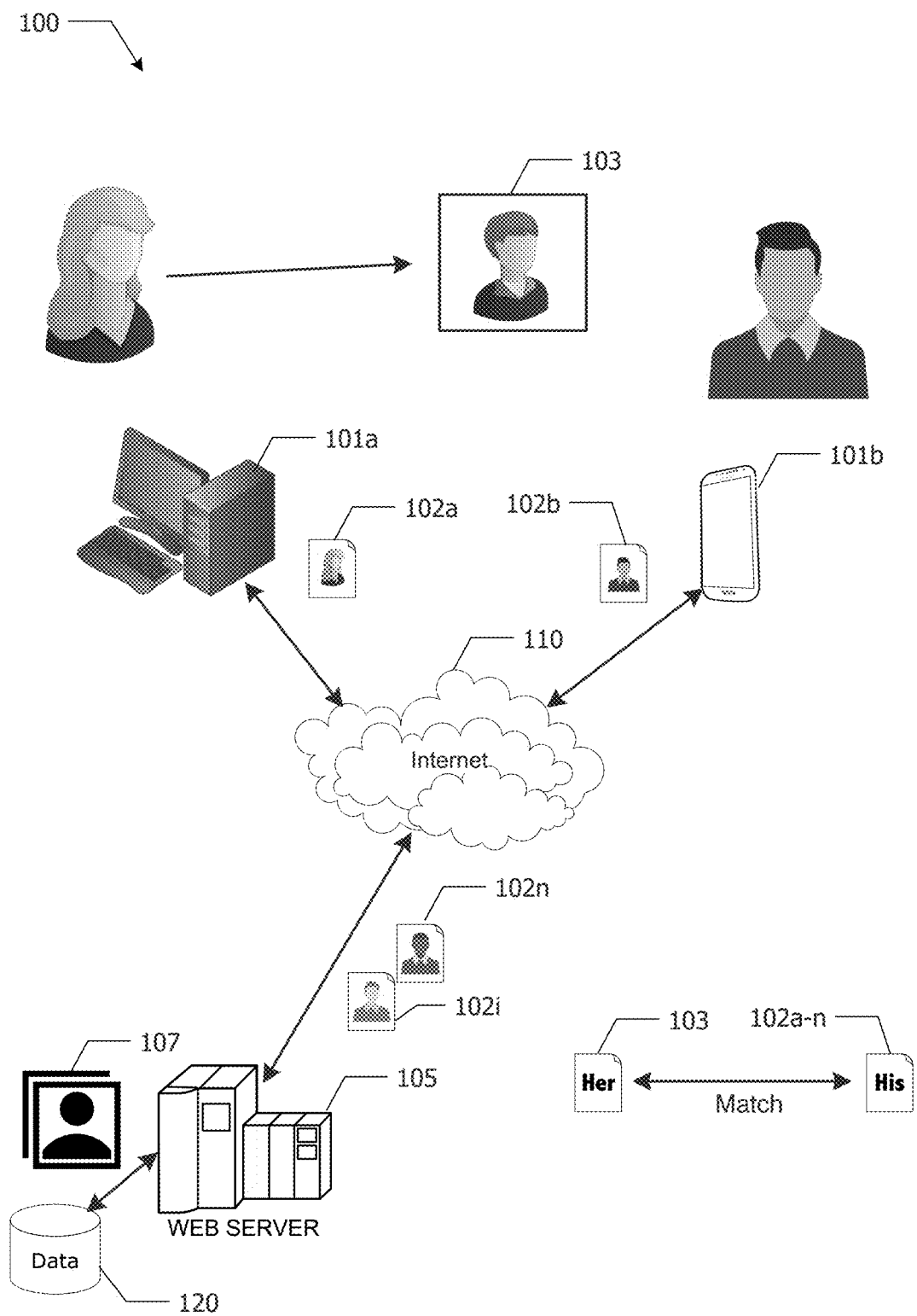
FIG. 1 illustrates an example embodiment of a system and method for providing non-binary profile mapping of individuals according to the present invention.

This application relates in general to a system and method for providing a matching mechanism, and more specifically, to a system and method for providing non-binary profile mapping of individuals according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using a system and method for providing non-binary profile mapping of individuals according to the present invention. The term user herein refers to one or more users.

The term "invention" or "present invention" refers to the invention being applied for via the patent application with the title "System and Method for Providing Design-Based Relationship Matching." Invention may be used interchangeably with application.

In general, the present disclosure relates to a system and method for providing non-binary profile mapping of individuals according to the present invention. To better understand the present invention, FIG. 1 illustrates an example embodiments of a system and method for providing non-binary profile mapping of individuals according to the present invention. The system 100 allows users to connect to a web server 105 having a database 120 of possible matches 107 over the Internet 110 using a personal computer 101a or mobile device 101b. The users enter data to define a user profile 107 that may be included into the database 120. Once the profile is in place, other users may search for a match and find a potential match 102-103 among the profiles 107 within the database 120.

Users are not matching to another profile based on their profile in the traditional sense. All users profiles are among the data encoded and stored to search. A user generates images, sound representations, and other uniquely identifying data of essentially a pseudo or synthetic profile of a person that doesn't exist also encoded, in both the generative media scene as well as the data profile sense of the meaning. This synthetic profile is being matched against the profile of actual users. As such, users are not searching directly for another user's profile. The synthetic profile/data/algorithm is being used by a matching engine, not to match the submitting user but the synthetic one to a real one.

As used herein, a profile is built from not binary nor one-hot multiple choice query decision utilizing machine learning. For example, One Hot is a math/data science/digital term meaning a singular truth in a set of otherwise false i.e., multiple choice with only one answer or in ML identifying a letter of the alphabet that may be calculated but must distill to a singular choice. Binary is true or false one truth one false—one hot is one truth of many false. The state of my driver license would be on possible truth of 50, I do or do not enjoy pizza is binary.

The data or algorithmic "profile" itself is neither binary nor non-binary but a culmination of data most likely represented as a fitted machine learning model. The matching itself occurs as a result of non-binary actions i.e., synthetic data is designed instead of making the aforementioned exclusionary choice such as swiping. A "profile" is also what the user may fill out with user characteristic information data which may be one-hot or binary i.e., Gender, Religion, and similar things that may be used by the matching engine. Captured media is one possible data input. At the most basic level, a user supplied profile of media would be needed to match the appearance of the generated synthetic person's appearance against within an accepted threshold. In addition to being used for encoding feature possibilities also are a required source of truth for the match. User designed synthetic media is encoded to a synthetic data/algorithmic profile similar to one generated for the user from their contributed media.

In a preferred embodiment, the matching engine will make use of many variables including generated by machine learning network such as classifiers, segmentation, as well as facial recognition. For example in the same way it may be inferred from the synthetic image in the profile being generated that the desired likes sports from depictions at sporting event or wearing apparel endorsed by their favorite athletes, this also applies to the real work contributed images in the user contributed profiles generating tags alongside those explicitly contributed.

For clarity, machine learning, as used throughout, is made use of in several areas. These processing techniques include segmentation, identification, and Tagging/classification of synthetic and submitted media (trained/training); encoding visual audio and other media into a representative space (training), and training in which a user interacts with now above encoded space to generate media. In addition, the matching engine itself has a machine learning component.

Machine learning networks are needed to interface with the encoded space in general. The training of these network could happen on a walled cloud instance, for example, Amazon Web Service (AWS) with resulting trained network inferencing more publicly and/or running with access from a web server. Some purchased, licensed, or similarly obtained pretrained machine learning solutions may be made use of and deployed or acquired by a service i.e., to handle audio transcription or language translation.

This present invention presents the novel approach of having a user model a desired appearance or range of appearance and performing member searches against the resulting image(s). This presents a clearer signal of desired appearance and an alternative to a two-sided, needle-in-a-haystack mutual binary agreement by chance pass. This can be extended to include the modeling of generation of synthetic data presented as other forms of media such as audio or video. For simplicity, however, a single image is often used. For example, various types of data are being encoded to support machine learning including variational inference and similar known ML/data science techniques for data encoding and optimization.

An interface for creating a synthetic human avatar to be used in search may present itself in a stylized manner and/or the content generated. "Cubism," "Cartoon" or "Anime" or similar could be examples of layered theming, stylization, filter, or style transfer applied to both interface and content. Any form desired by a user may be used to create the avatar to be searched.

The encoded space navigated is based on or at least include user membership of the service/app. This could be 2D image, 3D, (or include time as 4d), or a 3d image rendered as 2d dataset. Most current applications for generative media from encoded data make use of single dimensional interface elements such as sliders, GUI may leverage a multidimensional interface of 2 or more axis. Similar interface can navigate encoded audio data and render an audio form instead an image that may be used to generate a unique voice. Machine learning variational-autoencoders and similar as well as generators are understood and established machine learning network architectures.

The present invention instead uses an interface to navigate a space of machine learning-encoded latent data representation of features and likenesses of other users. The interface allows the user to generate synthetic data images of a person(s) he/she finds attractive. While the examples disclosed herein are limited to 2-dimensional input data, the concepts and techniques may be readily extended to a 3-dimensional space to design a 3D avatar of geometric and/or spatial sound data.

A variety of known computer vision, procedural programming techniques, machine learning and other known media-appropriate recognition techniques are employed in generation and matching. Synthetic images can be used to 'match' within a given amount of acceptability to member uploaded or otherwise provided images (i.e. social media linking to outside content etc.). This is a significant improvement over current systems which try to model desired appearance based on a noisy signal.

Auto encoders, variational autoencoders, and Convolution Nets, are common, but other architectures replace these things regularly in different application areas. In general, a regressor may be utilized to describe these type of networks for at least the encoding portion, however, any data processing architecture may be used to define the encoding within the scope of the present invention. The present invention is, however, defined using the limitations recited within the attached claims.

In one possible implementation the images are saved and used to refine the model further. Another implementation would be a live search of members or a restricted subset of users (i.e. members online now or within 10 miles) or using other search parameters. Yet another presentation would allow a "saved search" where a member is notified when the parameters image manifests as "recommended" or "suggested."

This approach is extendable and could include synthetic video generation matching a similarly encoded information space based on video contribution. A further logical hybrid extension would consider multiple modifiable features such as voice with appearance.

Additionally, Machine learning is used to isolate the people and items in contributed media. Identifiers can be created from both contributed and synthetic media respectively. The ability for the synthetic media to pass for the contributed one by generating a similar identifier or to pass for the contributed media is a sign of search parameter success. Matching involves various intersection and exclusion of many data points. With the vast amount of data points, ML will be needed in the matching process to infer what other sets of data points from another user would be compatible in part by encoding history of previous successful machines. The best possible match would match user B considering a synthetic profile designed by User A within acceptability and likewise considering the acceptability of the contributed profile of User A against the synthetic ones generated by B. A recommendation engine may be weighted in the matching process to gain additional results by inferring what unknown data point for user A or B may also be desirable although not specified by both parties.

Figure 2:
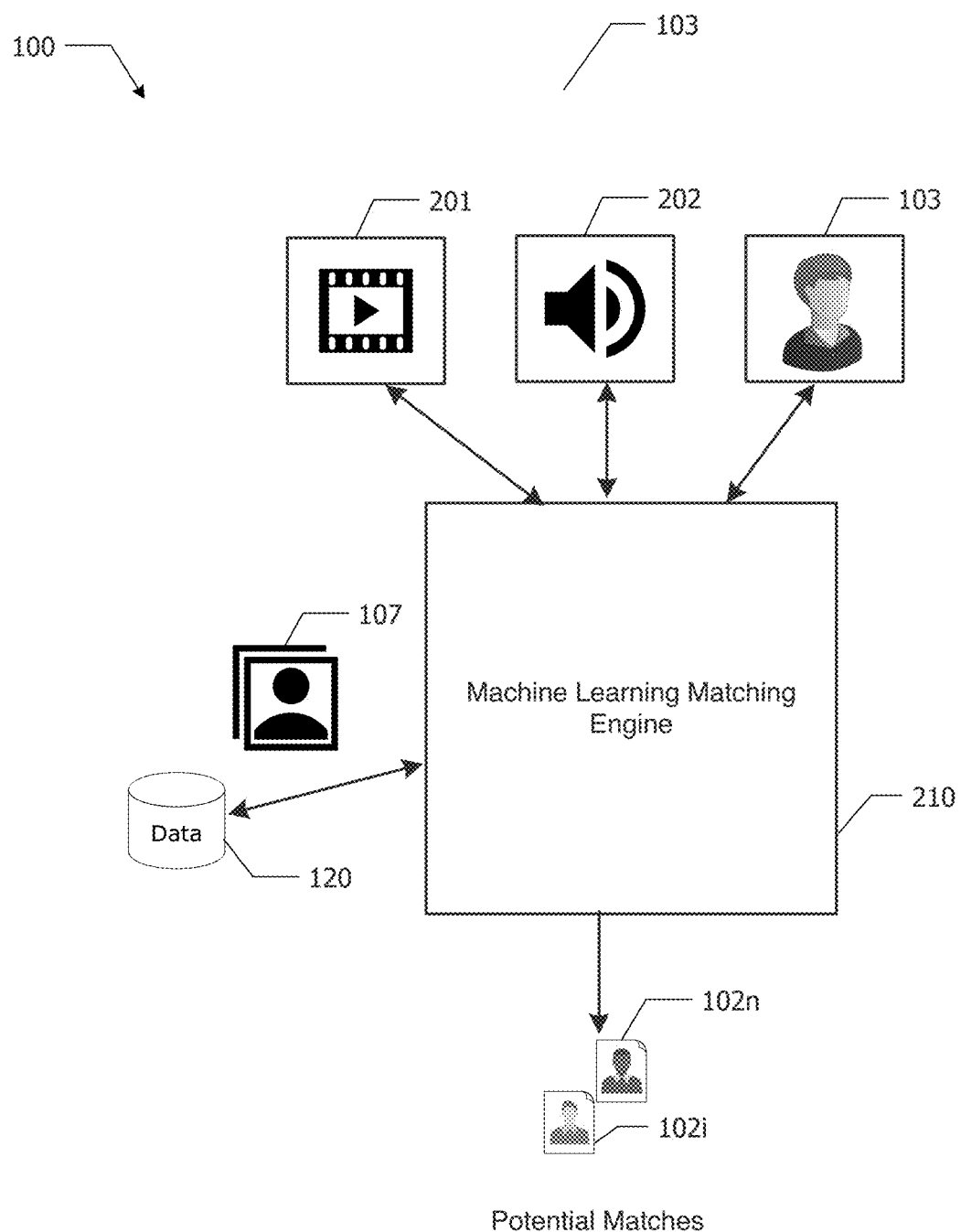
FIG. 2 illustrates the system and method for providing non-binary profile mapping of individuals according to the present invention.

FIG. 2 illustrates the system and method for providing non-binary profile mapping of individuals according to the present invention. Relationship matching engines 210 of modern dating apps as exemplified by the typical "dating app" largely rely on questionnaires and related profiles 107, and "swiping" whereby a totality of a single image is labeled in a positive of negative fashion. Similar questionnaires/profiles 107 use binary or one hot multiple choice query to utilize "crisp" or "rigid" values. For example "What would you say to coffee?" A) Yes, please! B) Maybe sometimes. C) No, thanks. D) Yuck!

This approach doesn't allow room for the "fuzziness" of human opinion that accounts for other aspects in context. This type of data acquisition is both rigid and based on a "pull model" where a user responds either to a set of known questions to compare against how a potential match answers the same questions. This also is context and noise sensitive. For example, "Where would you like to vacation?" A) The beach B) The mountains C) Las Vegas D) Bahamas. This type of one hot rigidness lacks context and the question itself lacks context and weight against other solicited pieces of information.

For example, "What time of year am I vacationing?" "Who am I with (might not want to bring children to Vegas)?" Perhaps an outdoors person would weight beach and mountains the same but not Vegas and the Bahamas.

This type of context-sensitive information requires coordination of many variables or signals. Additional ambiguity and noise are introduced through the subjectiveness and fuzziness of the label (target) as defined by one individual vs another. For another example, "body type" might be a presented as a parameter/feature for a match with rigid options including slim, average, overweight, obese, and extra. A user might label themselves obese and their potential match might even find that user's "body type" ideal but instead specified extra and average as acceptable for their match; that syntactical label of "extra" had a different subjective meaning, the disparity coming from what the two different users consider one body type over another causes the potential match to be weighted incorrectly. In a preferred embodiment, these variations in terms and intentions are much more easily manageable by machine learning by generalizing and clustering data against target features than it is by a human trying to specify combinations or permutations of acceptability. In long form text, these variations may not be practical, impossible to determine by one hot multiple choice questioning or binary response (i.e. True/False Like/Dislike) or fall victim to context and subjectiveness of syntactical labeling. Techniques used by neural networks to infer considering these context sensitive variables/features in captured media also can be applied to user-specified synthetic/generated media in the same manner.

In current applications, a user is presented with static, real-word media submitted by members alongside text/emoji information (this is typically a requirement for most relationship applications as typical policies dictate largely unaltered media with the member represented in it using facial recognition among other techniques for enforcement) as contributed by other members. This solicits a binary response. In contrast, the novel approach presented rather than pushing member-contributed real world media to a user and pulling a response; the user instead designs/specifies his/her idealized synthetic media using GUI to interact with latent space data representing the feature diversity of the membership, or non-membership, whether using visual features 201, sound 202, motion or other perceivable attributes. This idea is easily extendable to a variety of static- and time-based media, target features, and synthetic media compositions.

By combining media 201-202 representing one or more idealized matches or ranges of matches with other desirable examples and ranges of non-physically sensible attributes i.e. likes chocolate etc., one or more profiles of a synthetic human is made. Once this synthetic model exists, demographic, bio-metric media-matching routines, libraries, and any other operation that could otherwise be performed on real data captured media to find the identification of that person in a wider membership to a degree of certainty, can now be used on the synthetic media to find likely matches with a similar degree of certainty. In this new use case, the media and data profiles are designed and generated, the person in it never existed, and the goal is not to find the actual person-in-the-haystack that exists as a known user, but rather the person or people who would most reasonably pass for synthetic human over a reasonable threshold that may be user preference specified or otherwise globally configured, generated on a per user or global basis or other variable enforcement of configuration.

Further synthetic human characteristics, parameters, and features for the synthetic human data model can be inferred via known machine learning techniques in a machine learning matching engine 210 from the user guided generated synthetic media the same way it normally would be on captured data. For example, a user constantly generates media of a male who is wearing sport emblems and merchandise. Although the user may not have specified in text beyond the synthetic media, that a sports fan is desirable, another neural net infers a target like "sports fan" by using the membership contributed media and data for the individual member profiles (and potentially supplemental acquired media) combined with their specified interests. It has been widely demonstrated, for example, that facial features largely can be determined by captured voice recording, and in the same fashion a user-specified desirable synthetic voice can be used to infer desirable facial features. Another example could be a user generates video 201 of a female dancing and playing tennis, without it being explicitly specified in text beyond this generated media it may be inferred again by using a neural network pretrained on member contributed time-based media combined with user specified profile information that matches should include athletic people in physical lifestyle or professions.

Other uses could include finding actors, singers or other performers where physical or other media represented properties would be relevant. This can be extended to other relationships such as an ideal roommate.

Figure 3:
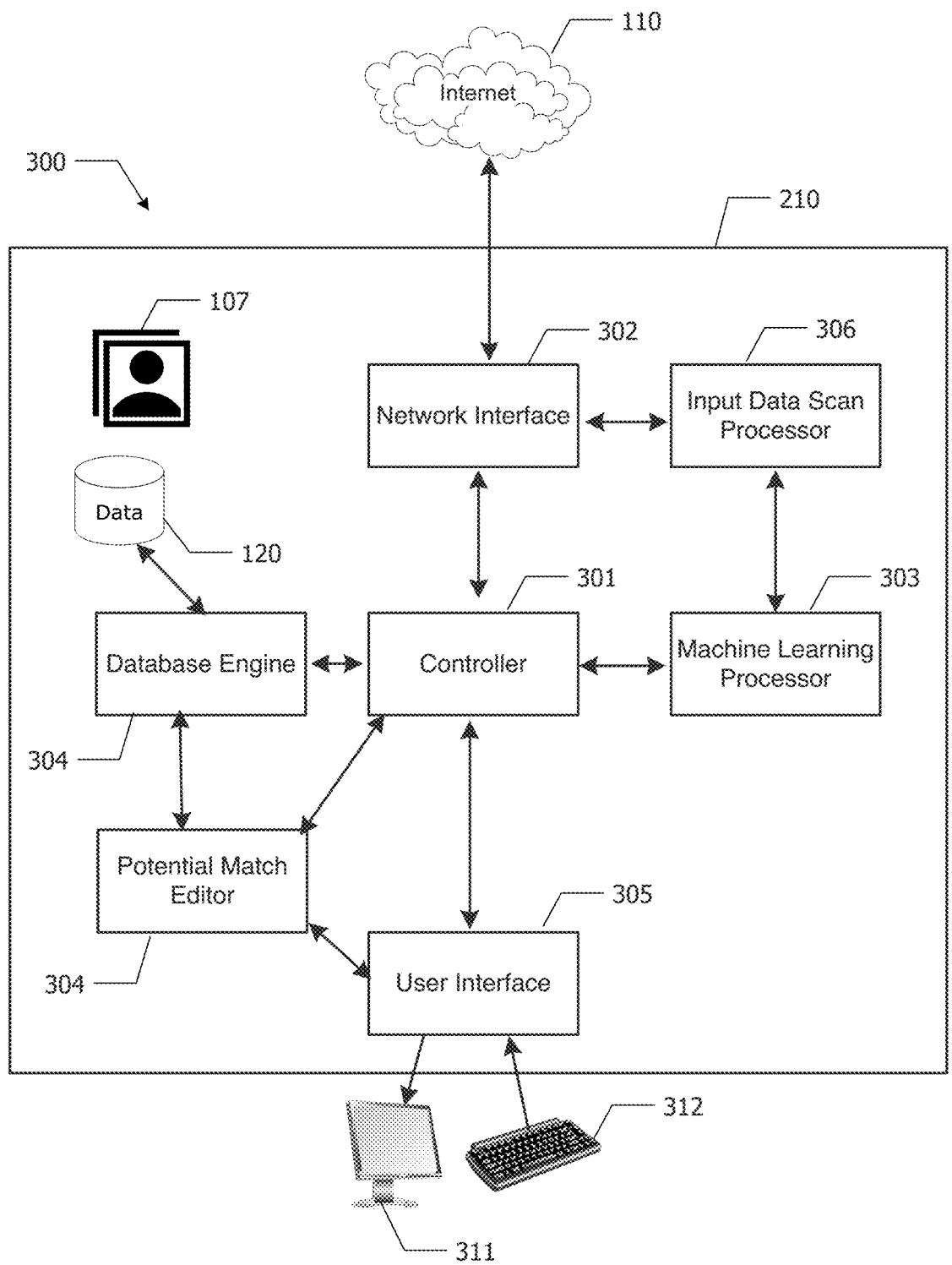
FIG. 3 illustrates a computing system of software components of a system and method for providing non-binary profile mapping of individuals according to the present invention.

FIG. 3 illustrates a computing system of software components of a system and method for providing non-binary profile mapping of individuals according to the present invention. The machine learning matching engine 201 that runs on a web server 110 may be constructed using a set of processing components 301-307. The set of processing components 301-307 comprises a matching engine controller 301, a network interface 302, a machine learning processor 303, a database engine 304, a user interface 306, an input data scan processor 306, and a potential match editor 307.

The matching engine controller 301 performs the overall control and process sequencing of data between the various processing components 302-307 to perform matching and data entry into the system. The matching engine controller 301 instructs each of the software components to perform the processing tasks of a given component on a set of data and may indicate a destination for the resultant output data. The output data may be passed to the database engine 304 for storage or to other components for subsequent processing.

The network interface 302 connects the server 105 to the Internet 110 to send and receive communication from users and the like. The network interface 302 performs all necessary data formatting, data packet creation, data encryption for security, and data transmission and reception when the server 105 communicates with other processing systems disclosed herein. The network interface 302 is also responsible for ensuring reception of any communications to other computing systems and logging any errors or attempts to hack into the database 120 and other processing and data components.

The machine learning processor 303 performs the data encoding and maintaining of data from searches and training data sets to permit the database 120 to be created and used in the matching processing. The machine learning processor 303 receives this input data and processes using the machine learning techniques to add data to the database 120.

The database engine 304 processes all database operations for the machine learning database 120. These operations include insertion of potential match profiles 107 and other data into the database 120, deletion of potential match profiles 107 from the database 120, searching and retrieving potential match profiles 107 from the database 120, and indexing the database 120 to maintain efficient searching when needed.

The user interface 306 provides input and output processing to provide a user with messages and data needed to perform the profile generation, desired match specification, and searching and matching potential matching profiles functions. This user interface module 306 also accepts commands from the user to instruct the machine learning matching engine 210 to perform these tasks.

The input data scan processor 306 receives user input data to create a synthetic human avatar for use to search for possible matches. User contributed data and media either pushed via submission or pulled via linked profiles is used in several places. This data is combed over by trained networks for segmentation, as well as other known computer vision, optical flow, and machine learning architecture to isolate potential areas of interest, for example, faces. This processed data will be taken into consideration by classifier networks to generate tags and syntactical labels/targets. This data will also be taken into account in the preprocessing of data for the training process, such as, how to crop an image, normalizing color spaces etc. User identified tags may be employed along the side of media/user contributed data for training further iterations or alternative or updated versions of a neural network tailored to classify the membership data and its related history.

User submitted data will be compressed and internally labeled and tagged to internal standards to conserve computing resources and to maintain resource constancy for serving and/or presentation; one such presentation is for viewing of matched profiles. There may be a human in the middle semi-manual approval process, automated or machine learning identification/flagging/approval process, or full human review of submitted media before accessible to other users, This additional processing could be for purposes of abiding by guidelines and policies of the service, intellectual property enforcement, or other reasons where the media is not beneficial to become publicly available or available inside the closed membership.

The potential match editor 307 provides a user an input interface to enter data into the system for use in matching. Specifically, the potential match editor 307 creates the synthetic human avatar and related profile that is used to search against other profile data within the database 120.

Figure 4:
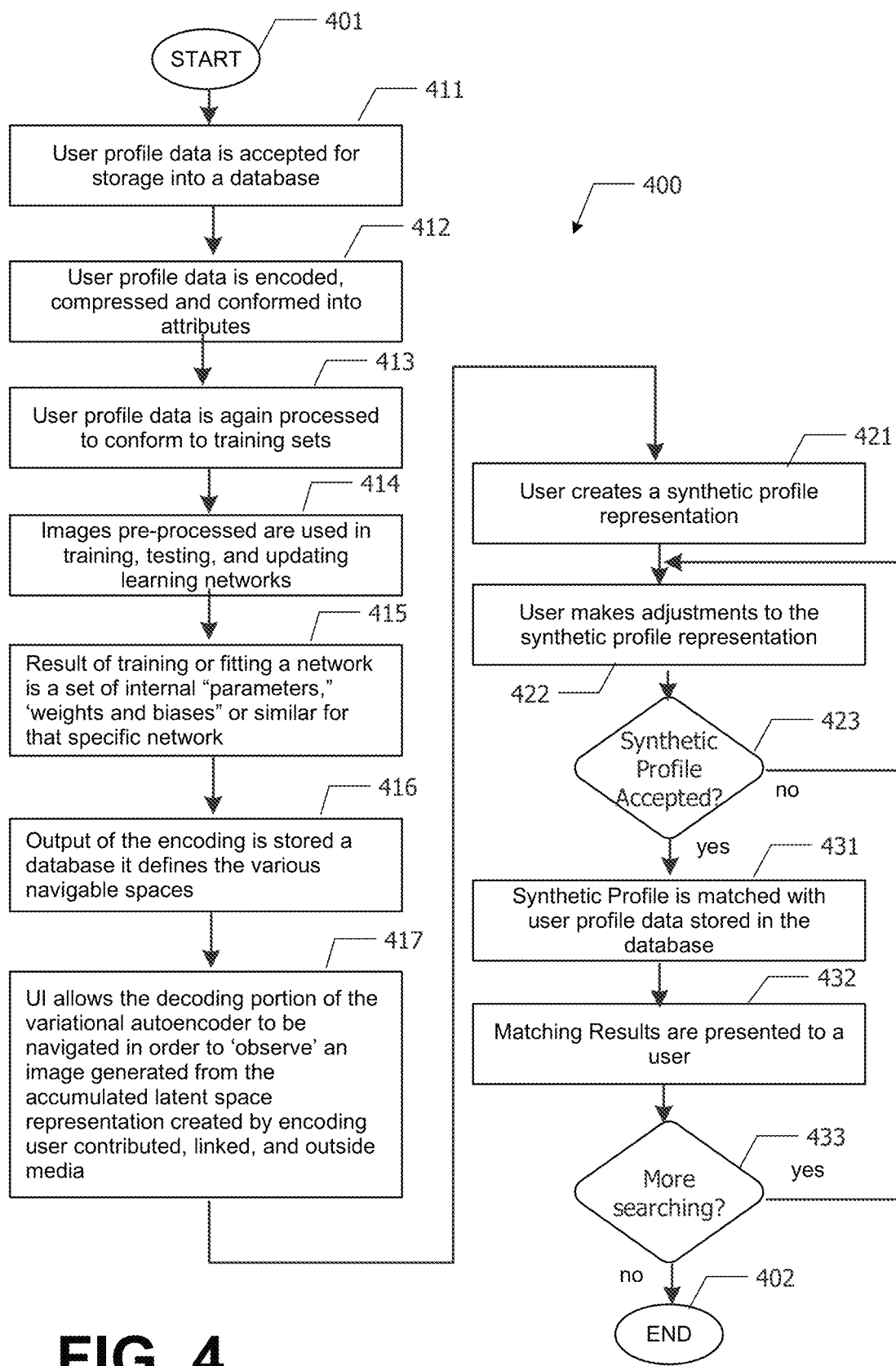
FIG. 4 illustrates a flowchart corresponding to a method performed by software components of a system for providing non-binary profile mapping of individuals to the present invention

FIG. 4 illustrates a flowchart corresponding to a method performed by software components of a system for providing non-binary profile mapping of individuals to the present invention. The method performs the following:

The process 400 begins 401 when user profile data is accepted and stored into a database in step 411. The user profile data is encoded, compressed, and conformed into attributes in step 412. The attributes may include size, color space, and other attributes for presentation and storage consistency and format. The user profile data is again processed to conform to Machine Learning training data sets used within a learning network in step 413. The accepted data and training set data may be stored for internal used.

Images may then be pre-processed in step 414 and used in training, testing, and updating learning networks; thereby creating, testing, contributing, defining, or redefining the latent representation that can later be sampled from. An encoder would be an example of a regressor that defines a latent space. A variational autoencoder is a current and well understood architecture intended to create this representation in an encoding process with the intention of being navigable to create new images by observing samples in the generative model as created by the encoding process.

In step 415, the result of training or fitting a network is a set of internal "parameters," 'weights and biases" or similar for that specific network. Output of the encoding is stored a database it defines the various navigable spaces in step 416. A UI allows the decoding portion of the variational autoencoder to be navigated, in step 417, in order to 'observe' an image generated from the accumulated latent space representation created by encoding user contributed, linked, and outside media.

Once the learning networks are completed, a user creates a synthetic profile representation in step 421. The user may make a series of adjustments to the synthetic profile representation in step 422 until test step 423 determines that user indicates that the synthetic profile representation is completed.

The Synthetic Profile representation is matched with user profile data stored in the database in step 431 with the results being presented to the user in step 432. Generated synthetic images or other synthetic media a user creates, are stored in a database along with other non-perceivable rigid information optionally specified. This is used to create a profile in a very similar way to a user creates their own profile. Additional neural nets comb over the generated synthetic media to identify, tag, areas, and feature of interest, further creating a 'data profile' similar to as is created for a user that can then be used by the matching engine.

The user indicates in test step 433 if additional searching is to be performed, and if so, the process 400 returns to step 422 to permit additional adjustments be made to the synthetic profile representation that can be subsequently used in searches. When test step 433 indicates that the user is completed searching, the process 400 ends 402.

Figure 5A:
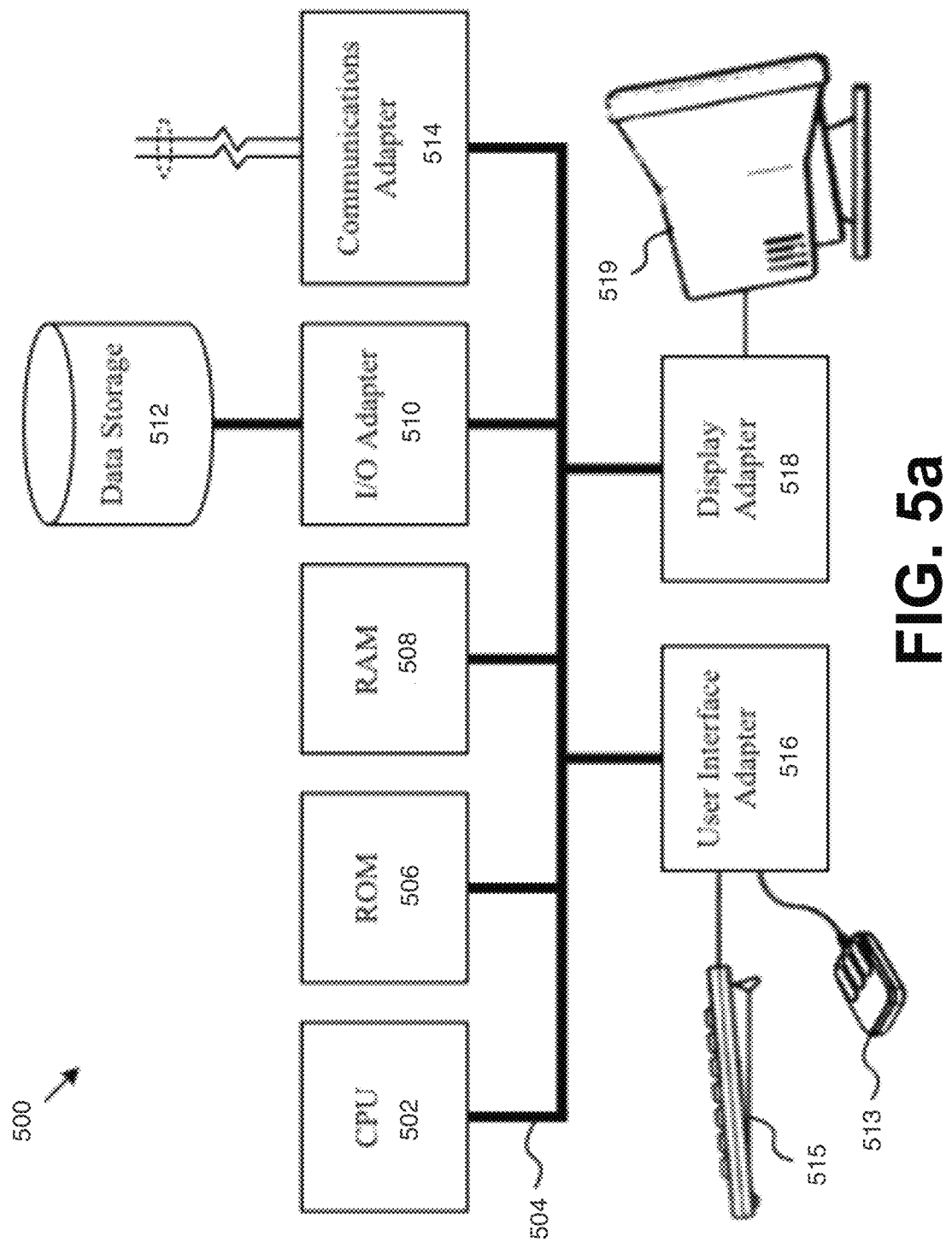
FIGS. 5a-c illustrate a generalized schematic of a programmable processing system utilized as the various computing components described herein to implement an embodiment of the present invention.
Figure 5B:
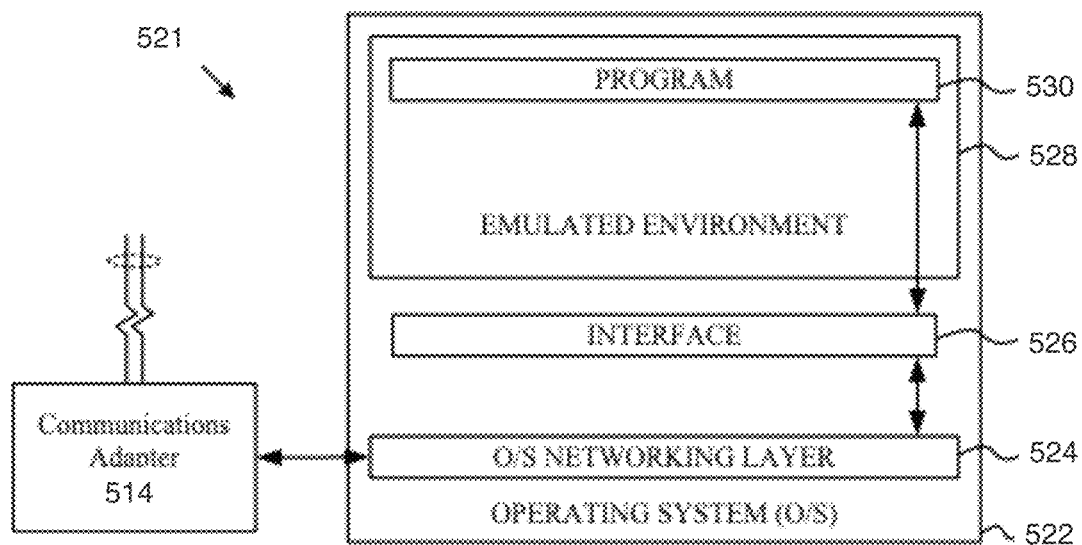
Figure 5C:
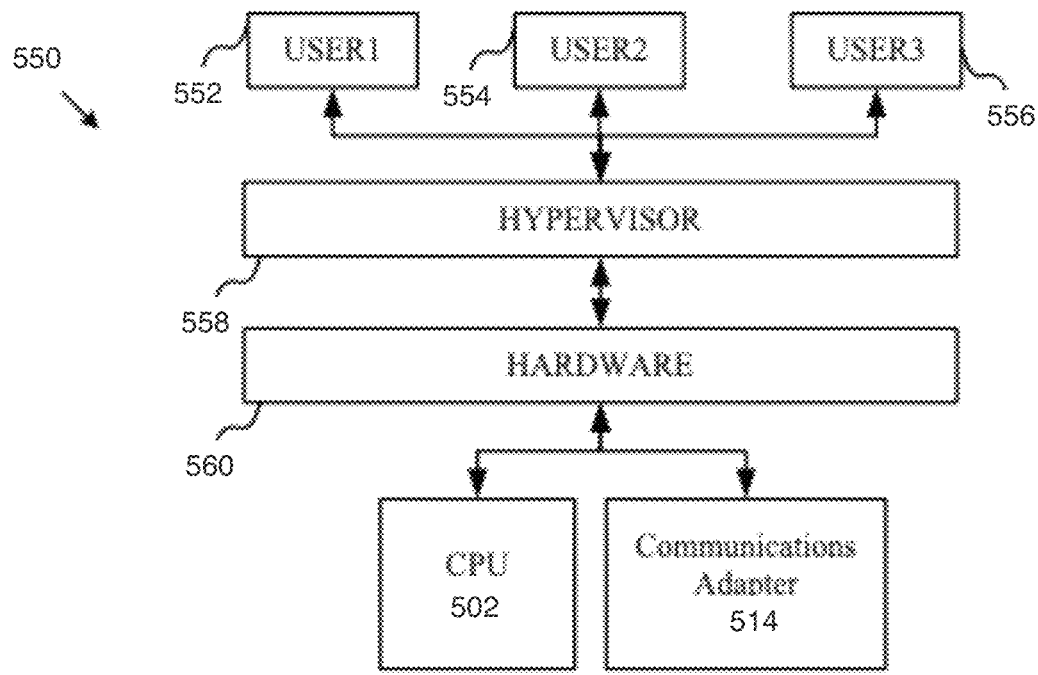

FIGS. 5*a-c* illustrate a generalized schematic of a programmable processing system utilized as the various computing components described herein used to implement an embodiment of the present invention. FIG. 5*a* illustrates a computer system 500 adapted according to certain embodiments of the server and/or the user interface device. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 also may include random access memory (RAM) 508, which may be synchronous RAM (SRAM), dynamic RAM (DRAM), synchronous dynamic RAM (SDRAM), or the like. The computer system 500 may utilize RAM 808 to store the various data structures used by a software application. The computer system 500 also may include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 also may include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI)

associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 110, which may be one or more of a LAN, WAN, and/or the Internet. The communications adapter 514 may also be adapted to couple the computer system 500 to other networks such as a global positioning system (GPS) or a Bluetooth network. The user interface adapter 516 couples user input devices, such as a keyboard 520, a pointing device 518, and/or a touch screen (not shown) to the computer system 500. The keyboard 520 may be an on-screen keyboard displayed on a touch panel. Additional devices (not shown) such as a camera, microphone, video camera, accelerometer, compass, and or gyroscope may be coupled to the user interface adapter 516. The display adapter 522 may be driven by the CPU 502 to control the display on the display device 524. Any of the devices 502-522 may be physical and/or logical.

The applications of the present disclosure are not limited to the architecture of the computer system 500. Rather the computer system 500 is provided as an example of one type of computing device that may be adapted to perform the functions of a server 105 and/or the user interface device 510. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 800 may be virtualized for access by multiple users and/or applications.

FIG. 5b is a block diagram illustrating a server 105 hosting an emulated software environment for virtualization 521 according to one embodiment of the disclosure. An operating system 522 executing on a server includes drivers for accessing hardware components, such as a networking layer 524 for accessing the communications adapter 514. The operating system 522 may be, for example, Linux. An emulated environment 528 in the operating system 522 executes a program 530, such as CPCommOS. The program 530 accesses the networking layer 524 of the operating system 522 through a non-emulated interface 526. The non-emulated interface 526 translates requests from the program 530 executing in the emulated environment 528 for the networking layer 524 of the operating system 522.

In another example, hardware in a computer system may be virtualized through a hypervisor. FIG. 5c is a block diagram illustrating a server hosting an emulated hardware environment 550 according to one embodiment of the disclosure. Users 552, 554, 556 may access the hardware 560 through a hypervisor 558. The hypervisor 558 may be integrated with the hardware 560 to provide virtualization of the hardware 560 without an operating system, such as in the configuration illustrated in FIG. 5a. The hypervisor 558 may provide access to the hardware 960, including the CPU 502 and the communications adaptor 514.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A system for providing non-binary profile mapping of individuals using an electronic apparatus, the system comprises:
    a memory having instructions stored thereon; and
    a processor configured to execute the instructions on the memory to cause the electronic apparatus to:
        establish a user profile database, the user profile database configured to store a plurality of real user profiles corresponding to a plurality of human users;

receive user profile data from an external user, the user profile data comprises captured media having a user image and user characteristic information data;
store user profile data into the user profile database;
receive user synthetic profile data from a first user;
generate a synthetic user profile representation for the first user based at least in part on the synthetic user profile data received from the first user;
adjust the synthetic profile representation in response to user input from the first user;
compare the synthetic user profile representation to one or more other real user profiles stored on the database;
generate a first set of matching results from processing the synthetic profile representation against real user profiles from the user profile database; and
provide the first set of matching results for selection.

2. The system according to claim 1, wherein the processor further executing instructions to:
rank the set of matching results utilizing the user characteristic information data;
receive user input to further adjust the synthetic profile representation in response to user input;
generate a second set of matching results from processing the synthetic profile representation against user profile data using the learning networks; and
provide the second set of matching results for selection.

3. The system according to claim 1, wherein the processor further executing instructions to:
encode, compress, and conform user profile data into a set of attributes;
process the user profile data to conform to training set data;
generate a set of internal parameters and weights and biases for use by a learning network; and
output encoded user profile data processed using the set of internal parameters and weights and biases for storage in the database.

4. The system according to claim 3, wherein the processor further executing instructions to:
define a restricted set of user profile data using one or more of the user characteristic information data;
generate a third set of matching results from processing the synthetic profile representation against the restricted set of user profile data using the learning network; and
provide the third set of matching results for selection.

5. The system according to claim 3, wherein the user profile data further comprises at least one of video and audio data of a user, the at least one of video and audio data of a user is processed by the learning network for inclusion in the database.

6. The system according to claim 1, wherein the processor further executing instructions to generate a first set of matching results from processing the synthetic profile representation against real user profiles from the user profile database comprises a bio-metric media matching routine.

7. The system according to claim 1, wherein the processor further executing instructions to:
infer one or more characteristics for the synthetic user profile representation via a machine learning technique based at least in part on user guided generated synthetic media.

8. The system according to claim 1, wherein the processor further executing instructions to:
infer characteristics for one or more of real user profiles stored on the database via a machine learning technique based at least in part on user profile data corresponding to the plurality of real user profiles.

9. The system according to claim 1, wherein the processor further executing instructions to:
recommend one or more characteristics for the synthetic user profile representation to the first real user based at least in part on a selected real user profile.

10. The system according to claim 1, wherein the processor further executing instructions to:
recommend one or more characteristics for the synthetic user profile representation to the first real user based at least in part on a previously executed saved search.

11. A method for providing non-binary profile mapping of individuals, the method comprising:
establishing a user profile database, the user profile database configured to store a plurality of real user profiles corresponding to a plurality of human users;
receiving user profile data from an external user, the user profile data comprises captured media having a user image and user characteristic information data;
storing user profile data into the user profile database;
receiving user synthetic profile data from a first user;
generating a synthetic user profile representation for the first user based at least in part on the synthetic user profile data received from the first user;
adjusting the synthetic profile representation in response to user input from the first user;
comparing the synthetic user profile representation to one or more other real user profiles stored on the database;
generating a first set of matching results from processing the synthetic profile representation against real user profiles from the user profile database; and
providing the first set of matching results for selection.

12. The method according to claim 11, wherein the method further comprising:
ranking the set of matching results utilizing the user characteristic information data;
receiving user input to further adjust the synthetic profile representation in response to user input;
generating a second set of matching results from processing the synthetic profile representation against user profile data using the learning networks; and
providing the second set of matching results for selection.

13. The method according to claim 11, wherein the method further comprising:
encoding, compressing, and conforming user profile data into a set of attributes;
processing the user profile data to conform to training set data;
generating a set of internal parameters and weights and biases for use by the learning network; and
outputting encoded user profile data processed using the set of internal parameters and weights and biases for storage in the database.

14. The method according to claim 13, wherein the method further comprising:
defining a restricted set of user profile data using one or more of the user characteristic information data;
generating a third set of matching results from processing the synthetic profile representation against the restricted set of user profile data using the learning networks; and
providing the third set of matching results for selection.

15. The method according to claim 11, wherein the user profile data further comprises at least one of video and audio data of a user, the at least one of video and audio data of a user is processed by the learning network for inclusion in the database.

16. A non-transitory computer-readable recording medium in an electronic apparatus for client configuration of a network device in a wireless network, the non-transitory computer-readable recording medium storing one or more programs which when executed by a programmable processor of the electronic apparatus performs steps comprising:
 establishing a user profile database, the user profile database configured to store a plurality of real user profiles corresponding to a plurality of human users;
 receiving user profile data from an external user, the user profile data comprises captured media having a user image and user characteristic information data;
 storing user profile data into the user profile database;
 receiving user synthetic profile data from a first user;
 generating a synthetic user profile representation for the first user based at least in part on the synthetic user profile data received from the first user;
 adjusting the synthetic profile representation in response to user input from the first user;
 comparing the synthetic user profile representation to one or more other real user profiles stored on the database;
 generating a first set of matching results from processing the synthetic profile representation against real user profiles from the user profile database; and
 providing the first set of matching results for selection.

17. The non-transitory computer-readable recording medium according to claim 16, wherein the method further comprising:
 ranking the set of matching results utilizing the user characteristic information data;
 receiving user input to further adjust the synthetic profile representation in response to user input;
 generating a second set of matching results from processing the synthetic profile representation against user profile data using the learning networks; and
 providing the second set of matching results for selection.

18. The non-transitory computer-readable recording medium according to claim 16, wherein the method further comprising:
 encoding, compressing, and conforming user profile data into a set of attributes;
 processing the user profile data to conform to training set data;
 generating a set of internal parameters and weights and biases for use by the learning network; and
 outputting encoded user profile data processed using the set of internal parameters and weights and biases for storage in the database.

19. The non-transitory computer-readable recording medium according to claim 18, wherein the method further comprising:
 defining a restricted set of user profile data using one or more of the user characteristic information data;
 generating a third set of matching results from processing the synthetic profile representation against the restricted set of user profile data using the learning networks; and
 providing the third set of matching results for selection.

20. The non-transitory computer-readable recording medium according to claim 18, wherein the user profile data further comprises at least one of video and audio data of a user, the at least one of video and audio data of a user is processed by the learning network for inclusion in the database.

* * * * *